(12) United States Patent
Maurer

(10) Patent No.: US 8,109,132 B2
(45) Date of Patent: Feb. 7, 2012

(54) METHOD FOR DETACHABLY CONNECTING A SENSOR FOR FLUID ANALYSIS TO A BODY CONTAINING SAID FLUID, AND CORRESPONDING APPARATUS

(75) Inventor: Heinrich Maurer, Jona (CH)

(73) Assignee: Swan Analytische Instrumente AG, Hinwil (CH)

( * ) Notice: Subject to any disclaimer, the term of this patent is extended or adjusted under 35 U.S.C. 154(b) by 394 days.

(21) Appl. No.: 12/444,323

(22) PCT Filed: Oct. 6, 2006

(86) PCT No.: PCT/EP2006/067161
§ 371 (c)(1),
(2), (4) Date: Apr. 21, 2009

(87) PCT Pub. No.: WO2008/040395
PCT Pub. Date: Apr. 10, 2008

(65) Prior Publication Data
US 2010/0000299 A1    Jan. 7, 2010

(51) Int. Cl.
*G01N 11/00* (2006.01)
(52) U.S. Cl. ...................................................... 73/53.01
(58) Field of Classification Search ................. 73/53.01, 73/625, 623, 61.41
See application file for complete search history.

(56) References Cited

U.S. PATENT DOCUMENTS 3,897,682 A * 8/1975 Brooks .......................... 73/149
5,115,676 A * 5/1992 Lee ................................. 73/706

\* cited by examiner

*Primary Examiner* — Jewel V Thompson
(74) *Attorney, Agent, or Firm* — Notaro, Michalos & Zaccaria P.C.

(57) ABSTRACT

The apparatus (1) comprises a sensor (3) having a sensor axis (A), for monitoring at least one property of a fluid; a body (2) for comprising said fluid; and a connecting system for detachably connecting said sensor to said body; wherein said connecting system comprises a fixing member (9) arranged at said body, rotatable around an axis (R) of rotation; and a retaining member (6) arranged at said sensor, interacting with said fixing member; wherein said axis of rotation is arranged substantially perpendicular to said sensor axis. The method is a method for detachably connecting a sensor (3) for monitoring at least one property of a fluid to a body (2) containing said fluid, said sensor having a sensor axis (A). Said method comprises the step of rotating a fixing member arranged at said body in a first sense of rotation around an axis (R) of rotation, thus causing said fixing member to interact in such a way with a retaining member arranged at said sensor, that said retaining member moves in a substantially translational way substantially parallel to said sensor axis. Said axis of rotation is arranged substantially perpendicular to said sensor axis. Preferably, said fixing member has a cross-section having substantially the shape of a section or a segment of an ellipse, in particular it has a substantially semi-circular cross-section.

22 Claims, 6 Drawing Sheets

METHOD FOR DETACHABLY CONNECTING A SENSOR FOR FLUID ANALYSIS TO A BODY CONTAINING SAID FLUID, AND CORRESPONDING APPARATUS

TECHNICAL FIELD

The invention has its origin in the field of water analytics and sensors for analyzing water. It originated from the problem of providing a watertight detachable connection for such a sensor to a body containing the water to be analyzed. The invention relates to apparatuses and methods according to the opening clauses of the claims.

BACKGROUND OF THE INVENTION

Sensors for water analysis are used, e.g., in chemical industry, pharmaceutical industry, semiconductor production, cooling water monitoring, drinking water and ground water analysis and monitoring, and in power plants, in which water used for for driving steam turbines is monitored for traces of contaminants.

Such sensors may, e.g., be pH sensors, conductivity sensors, oxygen sensors or ion sensitive sensors, depending on the property of the water to be sensed and on the specific application.

Detachable connections connecting a sensor to a body containing the water to be monitored in a watertight, preferably even pressure-tight manner are known in the art.

One such connection, e.g., the so-called NPT joint known in the USA, comprises a threaded joint having a conical thread, wherein PTFE (polytetrafluoroethylene) tape is attached to the joint for sealing the connection. The manufacture of such conical threads is costly, because low tolerances have to be met and stainless steel is usually used. In addition, quite some experience and skills and force is required for screwing in and unscrewing the sensor without provoking damage. If too little PTFE tape and/or a too high torque is applied, griping may occur.

Another such connection, which is easier to handle, makes use of a bayonet joint. Such connections are sometimes referred to as "quick lock". An elastomer ring is used for sealing, and a clockwise rotation of the sensor with respect to the body results in a fixed and tight connection, and counter-clockwise rotation allows to separate the sensor from the body. Also this kind of connection is costly to manufacture and often requires quite some force for establishing the connection. Another disadvantage is, that the rotational movement of the sensor with respect to the elastomer ring causes a considerable amount of friction and can result in damage of the elastomer ring and/or of the sensor, in particular if a particle happens to be located between the elastomer ring and the sensor.

SUMMARY OF THE INVENTION

Therefore, one object of the invention is to create a detachable connection that does not have the disadvantages mentioned above. A connecting system and an apparatus comprising said connecting system shall be provided, which can be opened and closed easily, without specific skills and without applying considerable force. In addition, the respective method for detachably connecting a sensor to a body, a corresponding sensor and a corresponding body shall be provided.

Another object of the invention is to provide for a high pressure tightness of said connection.

Another object of the invention is to allows for a quick closing and opening of said connection.

Further objects emerge from the description and embodiments below.

At least one of these objects is at least partially achieved by apparatuses and methods according to the patent claims.

The apparatus according to the invention comprises
 a sensor having a sensor axis, for monitoring at least one property of a fluid;
 a body for comprising said fluid; and
 a connecting system for detachably connecting said sensor to said body;
wherein said connecting system comprises
 a fixing member arranged at said body, rotatable around an axis of rotation; and
 a retaining member arranged at said sensor, interacting with said fixing member;
wherein said axis of rotation is arranged substantially perpendicular to said sensor axis.

The method according to the invention for detachably connecting a sensor for monitoring at least one property of a fluid to a body containing said fluid, said sensor having a sensor axis, comprises the step of
 rotating a fixing member arranged at said body in a first sense of rotation around an axis of rotation, thus causing said fixing member to interact in such a way with a retaining member arranged at said sensor, that said retaining member moves in a substantially translational way substantially parallel to said sensor axis;
wherein said axis of rotation is arranged substantially perpendicular to said sensor axis.

Through this, a firm connection of said sensor to said body can be achieved. Said fluid is typically a liquid, in particular a water-based liquid Said sensor is a sensor for fluid analysis, typically a sensor for water analysis.

Said sensor can be, e.g., at least one of the group comprising pH sensors, conductivity sensors, oxygen sensors, ion sensitive sensors. A pressure tightness up to 20 bar, 40 bar and even above 60 bar water pressure is readily achievable.

Preferably, the invention can provide for a sealed connection of said sensor to said body, i.e., for a way of connecting, in a sealing manner, a sensor to a body.

In one embodiment, said connecting system comprises a sealing member, which is arranged around an opening in said body. This can provide for great pressure tightness of the connection and for an improved manufacturability.

Said sealing member is preferably a deformable sealing member, in particular an elastically deformable sealing member, e.g., made substantially of an elastomer.

In one embodiment, said sealing member forms a closed loop. In particular, said sealing member is ring-shaped and/or has a substantially circular cross-section.

Through said opening, said sensor can be provided with access to said fluid.

In one embodiment, said retaining member is formed by an opening in said sensor.

In one embodiment, said said retaining member comprises a surface which is aligned within 30° perpendicular to said sensor axis. In particular, said surface is aligned within 10° perpendicular to said sensor axis. More particularly, said surfaces is aligned substantially perpendicular to said sensor axis. Through this, an efficient conversion of the rotating movement of said fixing member into the substantially translational movement of said retaining member substantially parallel to said sensor axis can be achieved.

In one embodiment, said fixing member has a cross-section having substantially the shape of a section or a segment of an ellipse, wherein also a (full) ellipse is considered a section or a segment of an ellipse. This allows to achieve an advantageous conversion of the rotatable movement of said fixing member to said translational movement of said sensor. Using relatively low forces for rotating said fixing member can result in relatively high forces with which said sensor is moved towards said body. In one embodiment, said ellipse is a circle. This simplifies the manufacturing.

In one embodiment, said fixing member has a substantially semi-circular cross-section. This provides for a good manufacturability and a great stability of the fixing member.

In one embodiment, said fixing member is comprised in a substantially rod-shaped member extending parallel to said rotation axis and having a substantially circular cross-section. In particular, said rod-shaped member extends substantially along said rotation axis. Said fixing member may have a shape obtainable by removing material from said substantially rod-shaped element. This provides for a good manufacturability.

In one embodiment, said sensor has a shaft.

In one embodiment, said axis of rotation is substantially a tangent of said shaft.

In one embodiment, said body has a shaft-guiding inner surface for guiding said shaft substantially along said sensor axis. This can allow to safely introduce said sensor into said body. Furthermore, this allows to substantially avoid a tilting of said sensor during closing of the connection. A too high degree of tilting, which might in particular occur when exactly one fixing member is provided, could decrease the tightness of the connection and can be avoided by the interaction of said shaft with said shaft-guiding inner surface.

In one embodiment, said shaft is substantially rotationally symmetric.

In one embodiment, said shaft-guiding inner surface is substantially rotationally symmetric.

In one embodiment, said axis of rotation is substantially a tangent of said shaft-guiding inner surface. Since typically the shaft-guiding inner surface is very close—within fractions of a millimeter—to said shaft, a tangent of said shaft-guiding inner surface is substantially the same as a tangent of said shaft.

In one embodiment, the connecting system comprises at least one additional fixing member. It is possible to foresee two, three or more fixing members instead of only one fixing member. Preferably, the fixing members are equally distributed over a circumference of the sensor. The fixing members may interact with separate retaining members or with one and the same retaining member. In the latter case, the one retaining member can be formed by one opening. This one opening can be a circumferential opening, in particular in a shaft of the sensor.

In one embodiment, a rotation angle by which said fixing member can be rotated is limited by at least one mechanical stop, in particular by two mechanical stops. Through this, one or two well-defined rotational positions of said fixing member can be made easily and precisely accessible, in particular a first rotational position, also referred to as open rotational position, in which said sensor can be separated from said body and attached thereto (open state of the connecting system), and a second rotational position, also referred to as closed rotational position, in which said sensor is fixed to said body (closed state of the connecting system).

In one embodiment, the maximum rotation required for reaching a closed rotational position of the fixing member from an open rotational position of the fixing member amounts to substantially less than one revolution, i.e., to substantially less than 360°.

In one embodiment, the maximum rotation required for reaching a closed rotational position of fixing member from an open rotational position of the fixing member amounts to substantially half a revolution, i.e., to substantially 180°. This can, e.g., the case, when the cross-section of the fixing member is substantially semi-circular.

In one embodiment, said connecting system comprises a blocking member interacting with said fixing member, which is arranged at said body, and which is movable with respect to said fixing member in a substantially translational way substantially parallel to said sensor axis. This blocking member can be used for securing said fixing member in some rotational position, in particular in the above-described second rotational position, in which said sensor is fixed to said body. The blocking member can be particularly useful when the apparatus is subjected to vibrations, since it may prevent a loosening of the connection due to undesired, vibration-induced rotations of said fixing member.

In one embodiment, said blocking member is movable between a first position and a second position and has an opening. Preferably, in said first position said opening is arranged next to said fixing member.

Preferably, when said blocking member is in said first position, said fixing member is rotatable, so as to allow to rotate said fixing member from said first rotational position of said fixing member (open rotational position) to said second rotational position of said fixing member (closed rotational position). Preferably, in said first position of said blocking member, said fixing member can, in full or in part, be located in said opening in said blocking member Preferably, when said blocking member is in said second position, said blocking member substantially inhibits or impedes a rotation of said fixing member.

In one embodiment, said movement of said blocking member is limited by at least one mechanical stop to a movement between said first and said second position. This can allow to easily move said blocking member precisely into said first position. And, in one embodiment, this can allow to to prevent said blocking member from being removed from said body.

The advantages of the methods correspond to the advantages of corresponding apparatuses.

Further preferred embodiments and advantages emerge from the dependent claims and the figures.

BRIEF DESCRIPTION OF THE DRAWINGS

Below, the invention is described in more detail by means of examples and the included drawings. The figures show schematically:

FIG. 6A a detail of FIG. 6;

The reference symbols used in the figures and their meaning are summarized in the list of reference symbols. The described embodiments are meant as examples and shall not confine the invention.

DETAILED DESCRIPTION OF THE INVENTION

Figure 1:
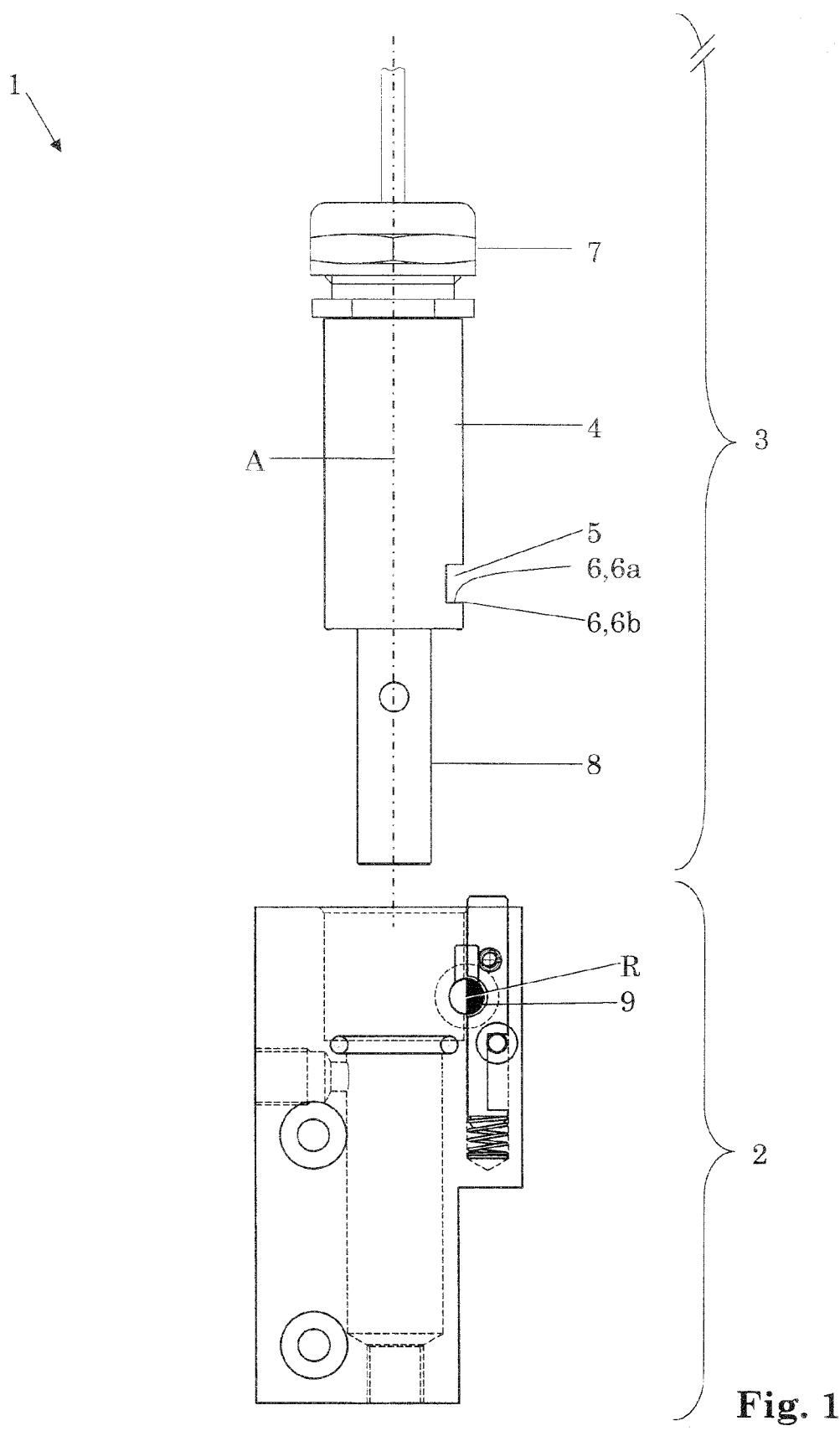
FIG. 1 an illustration of a side view of an apparatus in a state with sensor removed from body.

FIG. 1 is an illustration of a side view of an apparatus 1 according to the invention. The apparatus 1 comprises a body 2 and a sensor 3, e.g., a water sensor. The apparatus 1 is shown in a state referred to as open state, in which the sensor 3 can be separated from the body. In FIG. 1, the sensor 3 is removed from the body 2.

The sensor 3 has a shaft 4 having an opening 5 and an axis A. The opening 5 comprises a retaining member 6. In the embodiment of FIG. 1, the retaining member 6 comprises a surface 6*a* and an edge 6*b*. The surface 6*a* is aligned substantially perpendicular to said sensor axis A. The opening 5 could also be circumferential to said shaft 4.

The sensor 3 comprises a control unit (not shown), a connector 7 for the connection to the control unit and a sensing part 8. When a property of a fluid shall be monitored, the sensing part 8 has to be in contact with the fluid.

The apparatus 1 comprises a connecting system for detachably connecting said sensor 3 to said body 2, which comprises said retaining member 6 and a fixing member 9 arranged at said body 2. Said fixing member 9 is rotatable around an axis R. Fixing member 9 has substantially a semi-circular cross-section. States of the connecting system correspond to states of the apparatus, namely open state and closed state.

Figure 2:
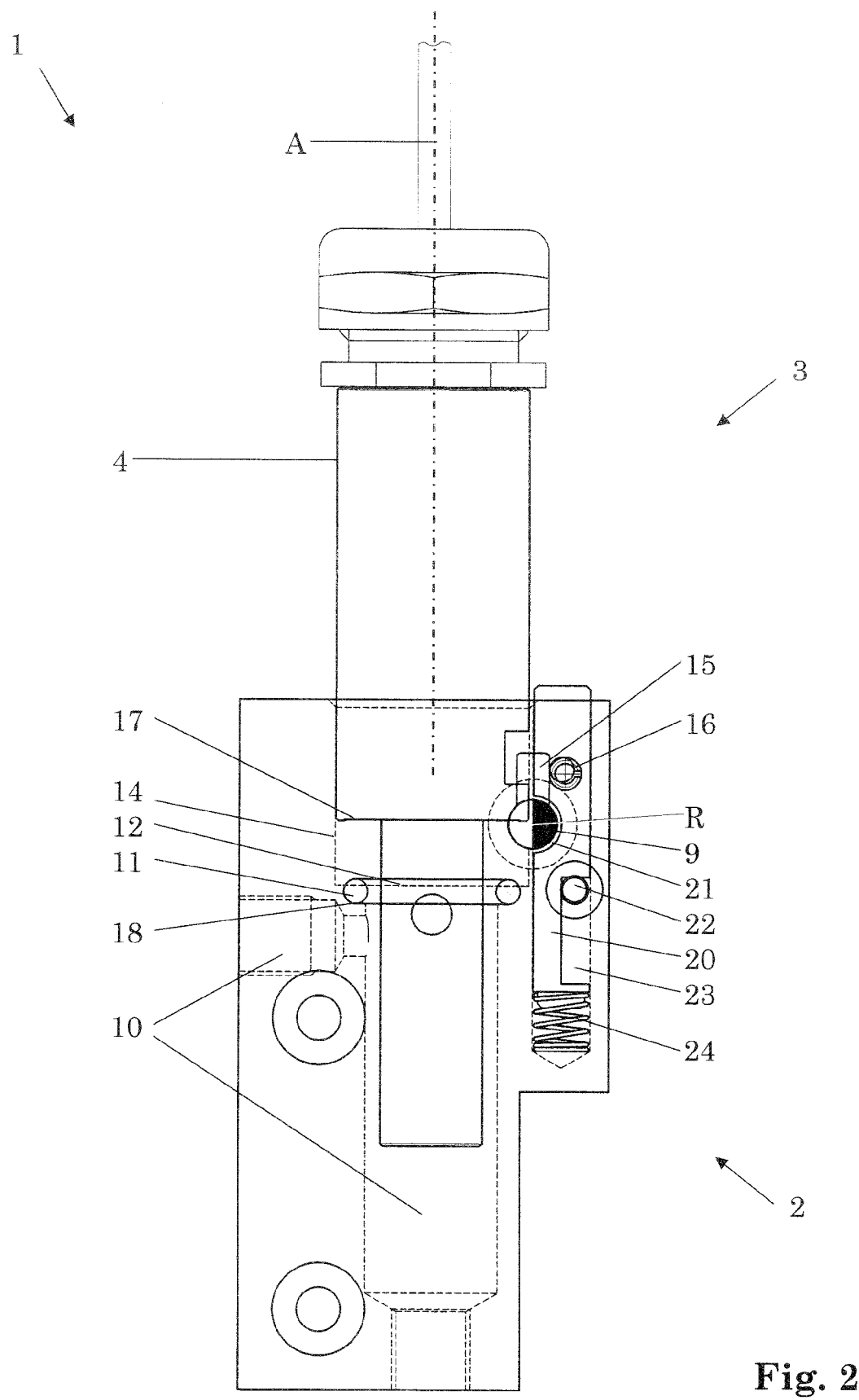
FIG. 2 an illustration of a side view of an apparatus in a state with sensor partially introduced into body.

FIG. 2 is an illustration of a side view of the apparatus 1 of FIG. 1 in a state with sensor 3 partially introduced into body 2. The direction along which the sensor 3 is introduced into body 2 is referred to as attaching direction D1. It runs parallel to sensor axis A. The opposite direction is referred to as separating direction D2, since the sensor 3 is separated and can be removed from body 2 along this direction.

The body 2 comprises a volume 10 for containing a fluid of which a property shall be monitored.

The body 2 forms an inner surface 14 for guiding the shaft 4 of sensor 3 when inserting sensor 3 into body 2. Preferably, the play between shaft 4 and inner surface 14 is of the order of 0.1 mm.

During introducing sensor 3 into body 2, fixing member 9 is in a rotational position, which does not inhibit this introducing, i.e., in this rotational position, which is also referred to as open rotational position, sensor 3 can be introduced into body 2 and separated from body 2.

The connecting system furthermore comprises a sealing member 11, embodied in FIG. 2 as an elastic sealing ring 11 arranged around an opening 12 in the body 2. Sealing member 11 interacts—in a closed state of the connecting system (cf. FIG. 4)—with two sealing surfaces 17,18, one of which (18) is arranged at said body 2 and the other of which (17) is arranged at said sensor 2. Envisaged dimensions (diameters) of openings 12 and sealing members 11 are typically of the order of some centimeters, e.g., between 0.5 cm and 10 cm, more particularly between 1 cm and 4 cm.

As can be seen in FIG. 2, body 2 is—near its sealing surface 18, i.e. near sealing member 11—shaped such that it holds sealing member 11 in place for preventing that sealing member 11 is unintentionally separated from body 2. For achieving this, body 2 projects beyond the location of the maximum diameter of sealing member 11 while tapering.

Due to a nose 15, embodied as a pin 15, which is fixedly connected to the fixing member 9, and which interacts with a stop 16, the open rotational position of the fixing member 9 can easily be reached with high precision.

The connecting system furthermore comprises a blocking member 20 having an opening 21. In the open state of the connecting system, as shown in FIG. 2, the blocking member 20 is in a first position, in which the fixing member 9 is arranged in the opening 21, thus allowing for a rotation of fixing member 9.

The blocking member 20 is springloaded due to a spring member 24. By means of fixing member 9, blocking member 20 is kept from being pushed out of body 2 by spring member 24.

Preferably, blocking member 20 may be basically rod-shaped, preferably with approximately circular cross-section.

Figure 3:
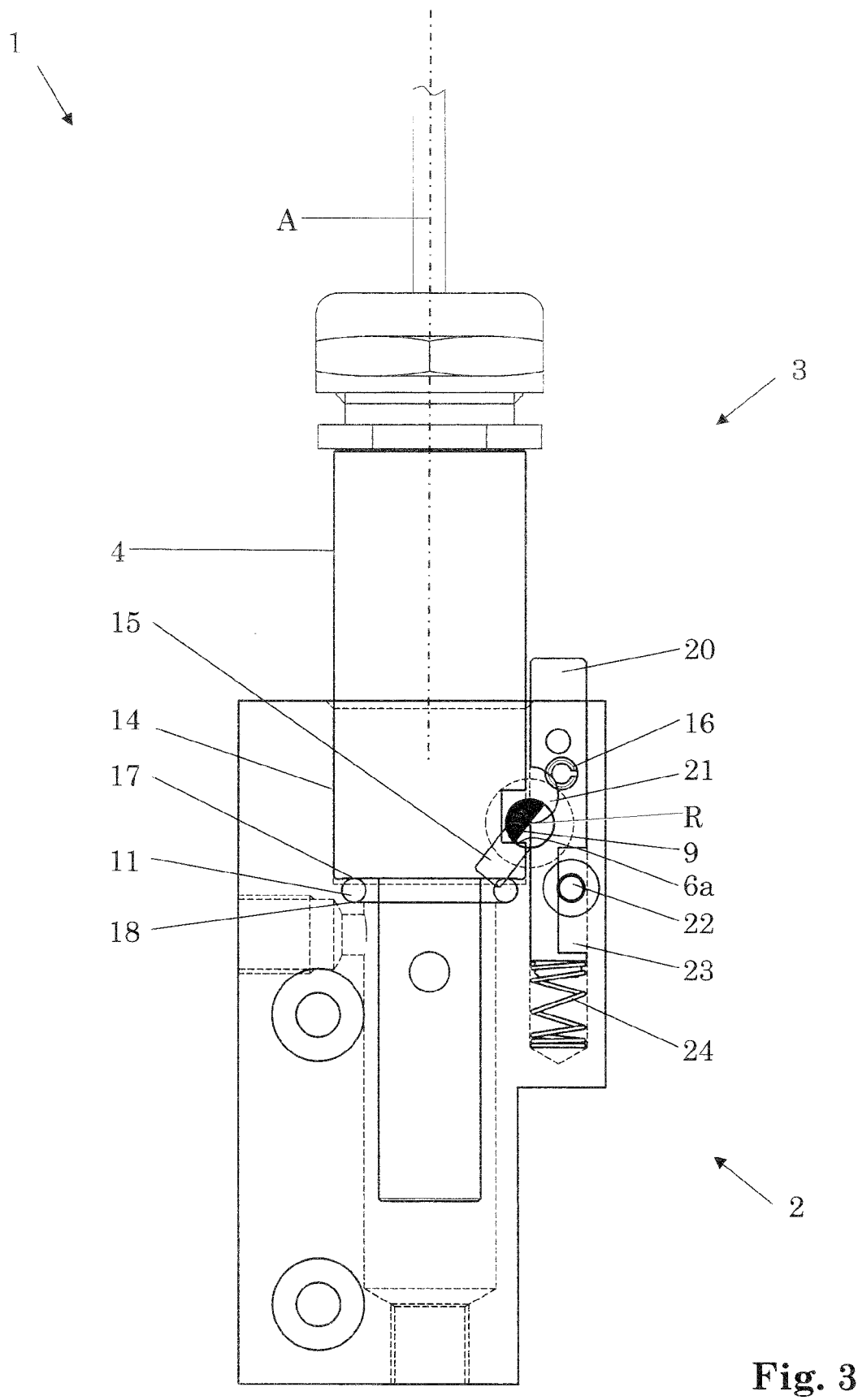
FIG. 3 an illustration of a side view of an apparatus in an intermediate state.

FIG. 3 is an illustration of a side view of the apparatus 1 of FIGS. 1 and 2 in an intermediate state. In this intermediate state, sensor 3 has been introduced into body 2 up to the point at which the sealing surface 17 touches the sealing member 11. On its opposite side, the sealing member is in touch with the sealing surface 18. The fixing member 9 has been turned up to the point at which it touches the surface 6*a*. Due to the shape of the fixing member 9, blocking member 20 has moved a bit out of body 2, wherein fixing member 9 interacts with blocking member 20 at its opening 21 such that a further movement of blocking member 20 is inhibited.

Blocking member 20 has an opening 23. A stop 22, e.g., a pin, is projecting into the opening 23 for preventing a full removal of blocking member 20 from body 2 in the closed state of the connecting system (cf. FIG. 4).

Figure 4:
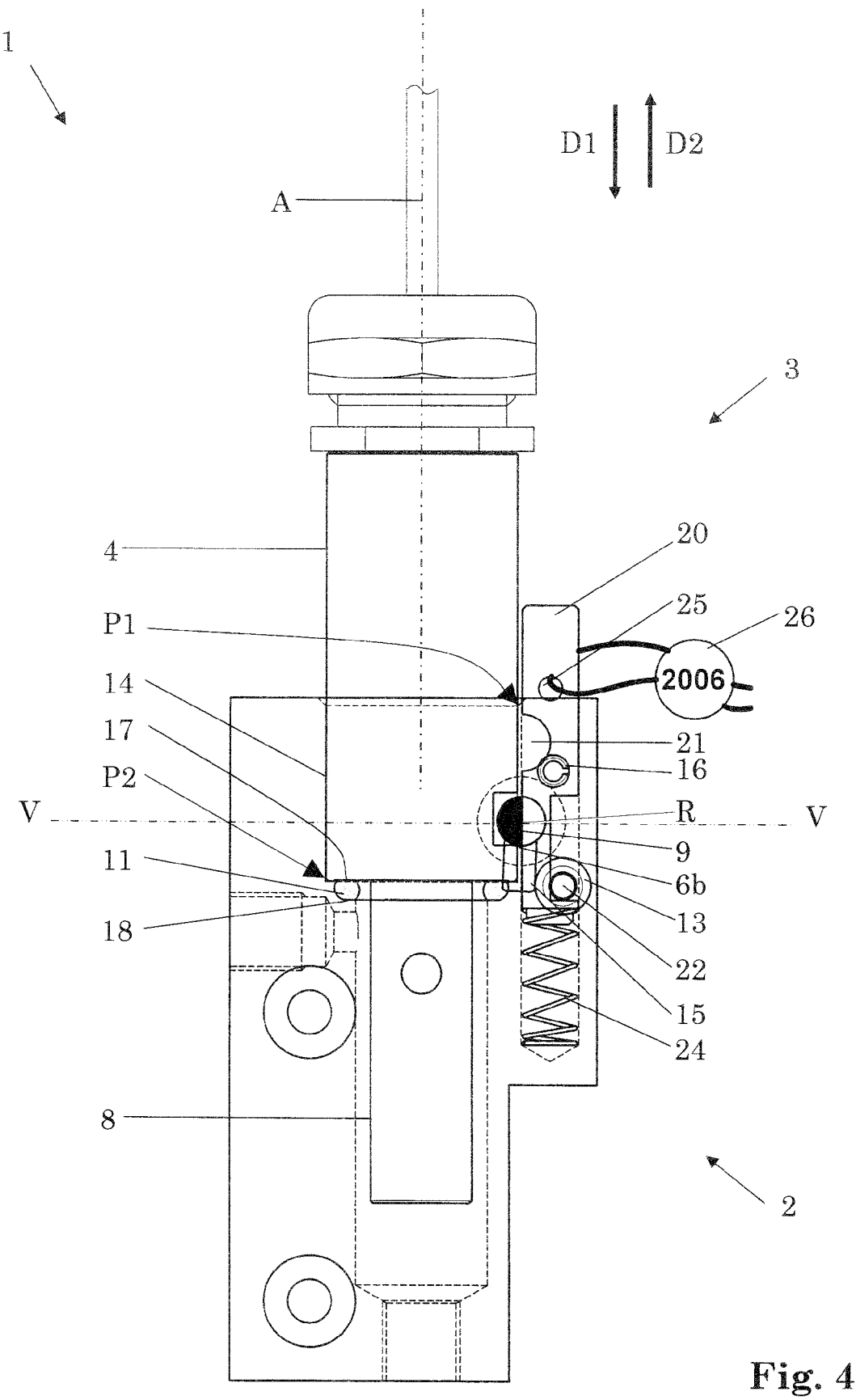
FIG. 4 an illustration of a side view of an apparatus in a state with sensor fixed to body.

A further turning (rotating) of fixing member 9 leads from the intermediate state shown in FIG. 3 to the state shown in FIG. 4, which is an illustration of a side view of the apparatus 1 of FIGS. 1 to 3 in a state with sensor 3 fixed to body 2 (closed state); in this closed state, fixing member 9 is in a rotational position referred to as closed rotational position.

By said further turning (rotating) of fixing member 9, fixing member 9 exerts a force on surface 6*a*, resulting in a substantially translational movement of the sensor substantially parallel to sensor axis A. In other words, fixing member 9 interacts with retaining member 6 (more precisely, with surface 6*a*) in such a way that a rotation of fixing member 9 in a first sense of rotation for reaching the closed state from the open state, causes a movement of retaining member 6 (and of the sealing surface 18 and sensor 3), which is a substantially translational movement substantially along the attaching direction D1, causing sealing member 11 to be squeezed between the two sealing surfaces 17, 18. The interaction between fixing member 9 and retaining member 6 is a direct interaction.

In the closed state, preferably (as shown in FIG. 4) the edge 6*b* is in touch with fixing member 9. It would also be possible that, in the closed state, surface 6*a* is in touch with an edge of fixing member 9 (not shown in FIG. 4).

Due to the fact that only one fixing member 9 is provided in the embodiment of FIG. 4, a small amount of tilting of sensor 3 occurs. Nevertheless, the movement of the sensor 3 when approaching the closed state is a substantially translational movement substantially parallel to sensor axis A. The degree of tilting is limited by the shaft-guiding inner surface 14 interacting with sensor 3 and, more particularly, with shaft 4. Accordingly, in the closed state, sensor 3 is not only in touch with sealing member 11 and fixing member 9, but also—approximately at the two points P1 and P2—with the shaft-guiding inner surface 14.

By means of fixing member 9, relatively high forces can be exerted, and sensor 3 can be held tightly fixed to sealing member 11. If the rotation angle of fixing member 9 around axis R is defined as substantially 0° in the closed position, the length, by which sensor 3 moves when approaching the closed state, depends on the rotation angle like the cosine of the rotation angle near 0°, i.e., approaching the closed state, the length by which sensor 3 travels per degree rotation angle decreases, which makes it easy to achieve relatively high forces near the closed state.

In the closed state (shown in FIG. 4), the sealing member 11 is squeezed between the surfaces 17 and 18, thus providing for a good water tightness.

The sensing part 8 extends—in the closed state—beyond said sealing member 11 into body 2.

A stop 13 allows to precisely reach the closed rotational position by interacting with nose 15. In the embodiment under discussion, stop 13 is embodied as a part of a screw, wherein this screw is, at the same time, used for closing a bore, which contains stop 22, wherein stop 22 may be embodied as a pin or a rod inside said bore. More generally spoken, stop 22 is inside a volume of body 2, which volume is at one side limited by a closing member (said screw), which is integrally formed with stop 13, which limits the rotation angle of fixing member 9.

By means of the two stops 13 and 16, the rotation angle by which the fixing member 9 can be rotated is limited to an angular range of substantially 180°. Depending on the shape of fixing member 9 and on the design and arrangement of blocking member 20, it can be meaningful to limit said rotation angle to an angular range amounting to between 150° and 210° or to between 165° and 195°. In case that the cross-section of fixing member 9 is a rather small segment of a circle, said angular range may even amount to up to 270° or above.

As can be seen in FIG. 4, blocking member 20 has been pushed further out of body 2 by spring member 24. This is possible, because fixing member 9 has been rotated into the closed rotational position. In the closed rotational position, a flat side of fixing member 9 faces blocking member 20, which leaves space allowing blocking member 20 to pass by. Blocking member 20 is in a second position. In this second position, blocking member 20 impedes rotation of fixing member 9.

In the second position of blocking member 20, a hole 25 is exposed close to body 2. This hole 25 can be used for attaching a seal 26 to blocking member 20.

For a release of sensor 3 from body 2, e.g., for removing sensor 3 for maintenance, fixing member 9 has to be rotated, which is only possible if blocking member 20 is moved. A total removal of blocking member 20 from body 2 is inhibited by stop 22. The preferred way of reaching the open state from the closed state is to (manually) push blocking member 20 back into its open position. But this is only possible if seal 26 is removed from hole 25.

Figure 5:
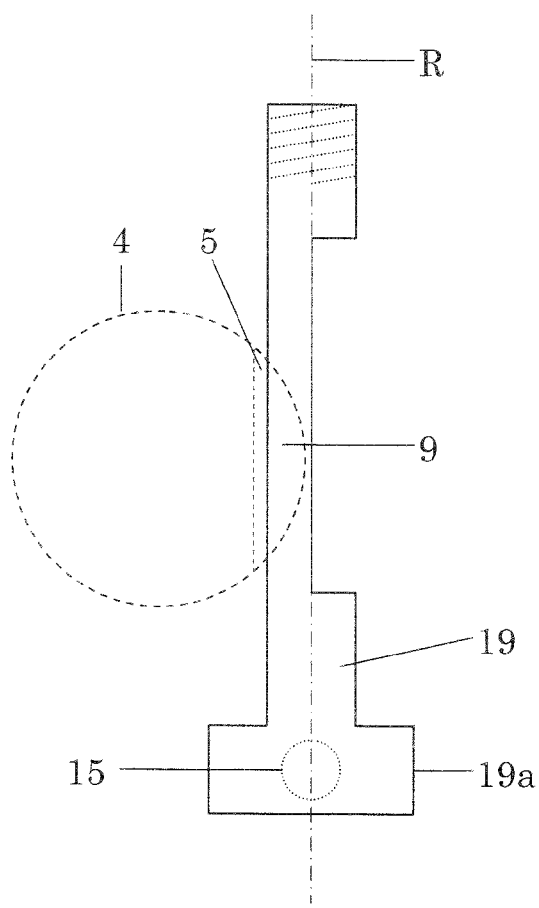
FIG. 5 a detail of a top view onto a cut through FIG. 4 along V-V.

FIG. 5 shows a detail of a top view onto a cut through FIG. 4 along the line indicated by V-V (blocking member 20 and body 2 are not shown). Fixing member 9 can be formed by removing material from a substantially rod-shaped member 19, e.g., a screw. In that portion of member 19, which forms fixing member 9, there is preferably no thread. The screw head 19a may preferably be a socket head (internal wrenching head). Preferably, pin 15 is attached thereto. Using an appropriate tool for rotating fixing member 9 (by inserting the tool into the screw head) allows to open and close the detachable connection without the need to apply great forces. More generally spoken, fixing member 9 is comprised in a member 19, which comprises a head 19a into which a tool can be inserted for provoking a rotation of fixing member 9 by means of said tool.

Figure 6:
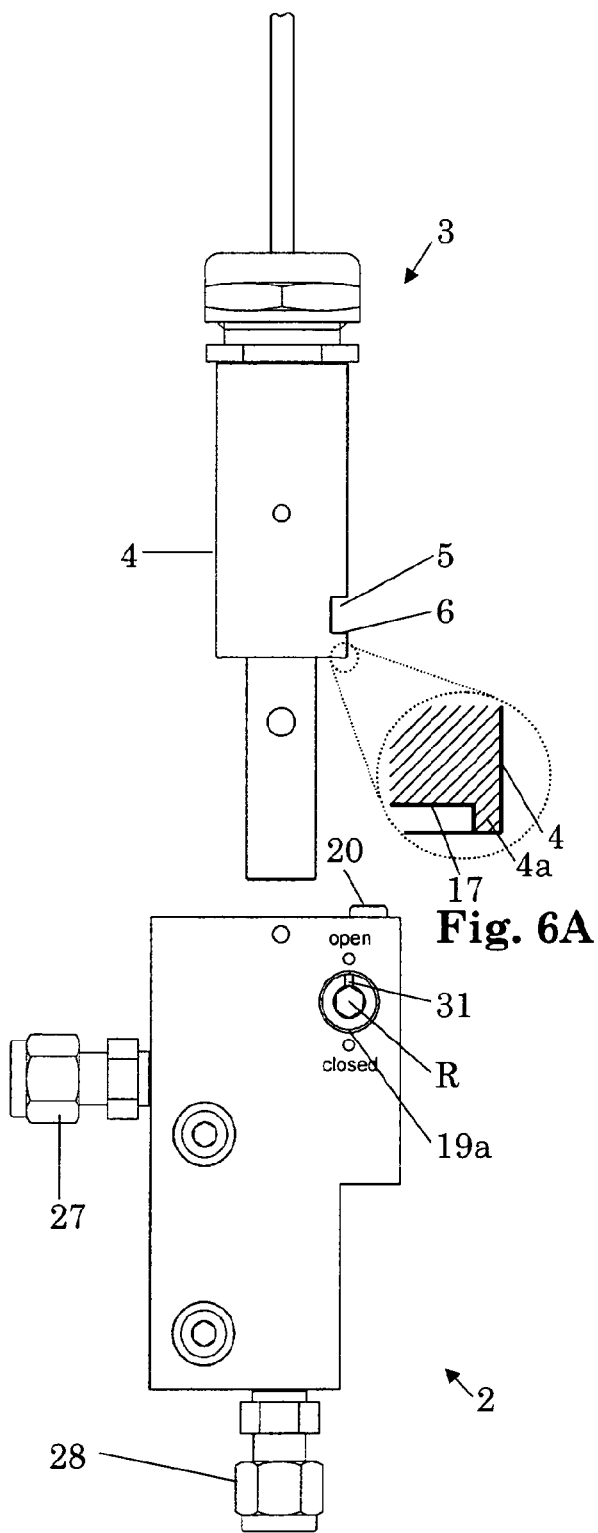
FIG. 6 a side view onto an apparatus in a state with sensor removed from body.

FIG. 6 shows a side view onto the apparatus of FIGS. 1 to 4 in a state with sensor 3 removed from body 2. Two connectors 27, 28 are attached to body 2 for guiding a fluid to be measured, in particular water, into body 2 and out of body 2 again. Fixing member 9 is in the open position as can be seen from marker 31 at member 19, more precisely at head 19a.

FIG. 6A shows a detail of FIG. 6. Sensor 3 comprises a projecting part 4a surrounding sealing surface 17. Such a projecting part 4a can provide for protection of sealing surface 17 from damage.

Figure 7:
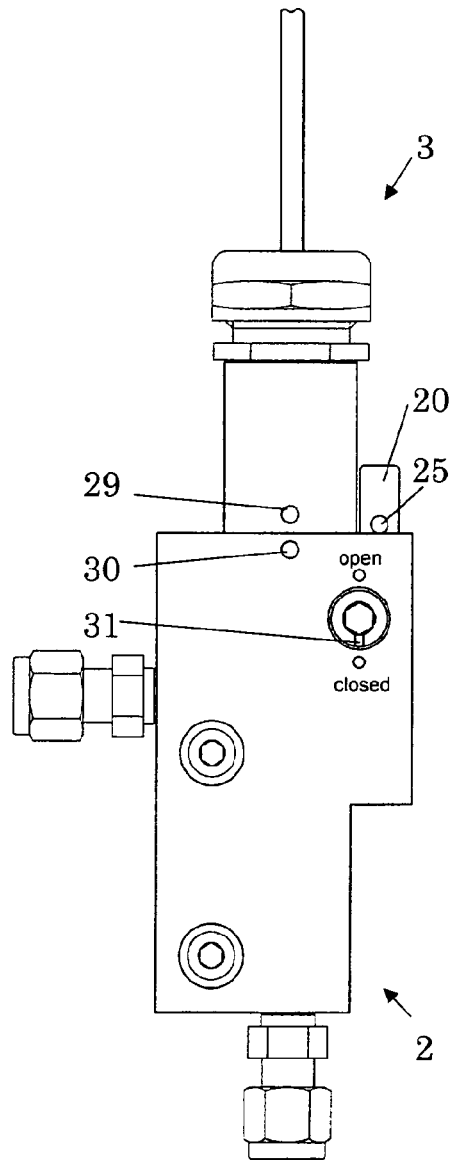
FIG. 7 a side view onto an apparatus in a state with sensor fixed to body.

FIG. 7 is a side view onto the apparatus of FIGS. 1 to 4 and 6 in a state with sensor 3 fixed to body 2. Fixing member 9 is in the closed position as can be seen from marker 31 at member 19.

On sensor 3 and body 2, markers 29 and 30, respectively, are provided, which help to choose a suitable rotational state of sensor 3 with respect to body 2 for establishing the connection. In case of a circumferential opening 5, such markers 29, 30 could well be omitted.

Obviously, the sense of rotation for a rotational movement of fixing member 9 when reaching the closed state from the open state, can be clockwise or, as shown in FIGS. 6 and 7, counter-clockwise.

Shaft 4 is preferably substantially made of stainless steel; sensing part 8 is preferably substantially made of stainless steel; body 2 is preferably substantially made of stainless steel.

During closing of the connection, fixing member 9 basically functions like a lever, particularly like a very sturdy lever. In the closed state, fixing member 9 basically functions as a mechanical resistance against a movement of sensor 3 in direction D2 (outward movement of sensor 3), i.e., it contributes to a fixing of sensor 3 in the closed state.

Figure 8:
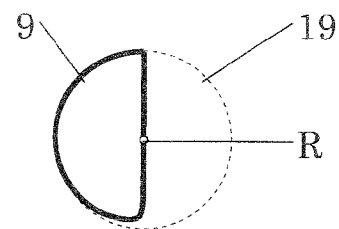
FIG. 8 a cross-section of an embodiment of a fixing member.

FIG. 8 shows a cross-section of an embodiment of a fixing member 9. The cross-section has substantially the shape of a semicircle. At least one edge of the semicircle is rounded. This can provide an enlarged contact area between surface 6a and fixing member 9 in the closed state and while rotating fixing member 9 for entering the closed state. Preferably, the fixing member 9 is manufactured from a rod-shaped member 19.

Figure 9:
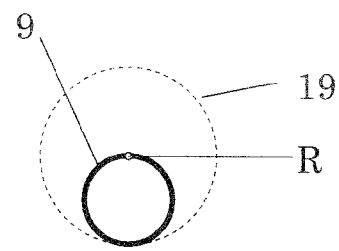
FIG. 9 a cross-section of an embodiment of a fixing member.

FIG. 9 shows a cross-section of an embodiment of a fixing member 9. The cross-section has substantially the shape of a circle. The axis R of rotation is excentric. In particular, the axis R of rotation is located on the circumference of the circle. Preferably, the fixing member is manufactured from a rod-shaped member 19 of substantially twice the diameter of the circle of the fixing member 9.

Figure 10:
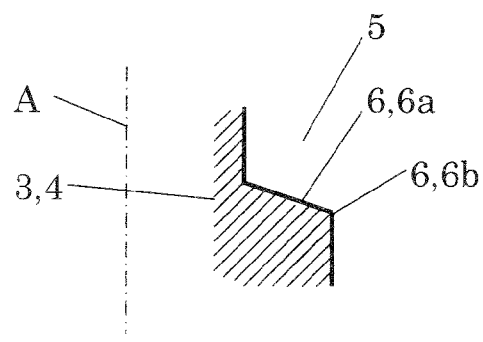
FIG. 10 a cross-section of an embodiment of a retaining member.

FIG. 10 shows a cross-section of an embodiment of a retaining member 6. It comprises a surface 6a, which is inclined by an angle between 10° and 20° with respect to a plane perpendicular to the sensor axis A.

Figure 11:
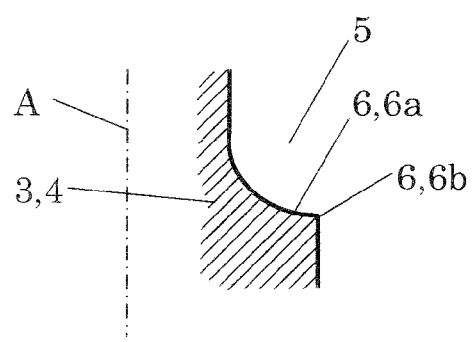
FIG. 11 a cross-section of an embodiment of a retaining member.

FIG. 11 shows a cross-section of an embodiment of a retaining member 6. It comprises a surface 6a, which is—at least in part—substantially perpendicular to the sensor axis A. Surface 6a is curved, in particular having—at least in part—the shape of a circle's perimeter. This can provide an enlarged contact area between surface 6a and fixing member 9 in the closed state and while entering the closed state. Preferably, the curvature of retaining member 6 is at least partially matched with a curvature of fixing member 9.

It is possible to open and close the connection many times, e.g., for testing or maintenance, and still reach a tight connection, possibly even without using a new sealing member 11.

By means of the invention, it is possible to reach a well-defined, prescribable amount of compression exerted on sealing member 11. This allows to choose an optimized load (strain) of the sealing member 11 and, accordingly, a good sealing readily withstanding water pressures in body 3 of above 60 bar. And furthermore, the invention provides for a sturdy fixing of sensor 3 to body 2, which prevents sensor 3 from being removed from body 2 in the closed state.

LIST OF REFERENCE SYMBOLS 1 apparatus, system
2 body, container
3 sensor
4 shaft
4a projecting part
5 opening
6 retaining member
6a surface
6b edge
7 connector
8 sensing part
9 fixing member
10 volume
11 sealing member
12 opening
13 stop
14 inner surface, shaft-guiding inner surface
15 nose, pin
16 stop
17 sealing surface
18 sealing surface
19 member
19a head, screw head, wrenching head, socket head
20 blocking member
21 opening
22 stop
23 opening
24 spring member
25 hole
26 seal
27 connector
28 connector
29 marker
30 marker
31 marker
A sensor axis
D1 attaching direction
D2 separating direction
P1 point
P2 point
R rotation axis

The invention claimed is:

1. Apparatus (1) comprising
a sensor (3) having a sensor axis (A), for monitoring at least one property of a fluid;
a body (2) for comprising said fluid; and
a connecting system for detachably connecting said sensor to said body;
wherein said connecting system comprises
a fixing member (9) arranged at said body, rotatable around an axis (R) of rotation; and
a retaining member (6) arranged at said sensor, interacting with said fixing member;
wherein said axis of rotation is arranged substantially perpendicular to said sensor axis.

2. The apparatus according to claim 1, wherein said connecting system comprises a sealing member (11), which is arranged around an opening (12) of said body.

3. The apparatus according to claim 1, wherein said retaining member is formed by an opening (5) in said sensor.

4. The apparatus according to claim 1, wherein said retaining member comprises a surface (6a) which is aligned within 30° perpendicular to said sensor axis.

5. The apparatus according to claim 1, wherein said fixing member has a cross-section having substantially the shape of a section or a segment of an ellipse.

6. The apparatus according to claim 5, wherein said fixing member has a substantially semi-circular cross-section.

7. The apparatus according to claim 6, wherein said fixing member is comprised in a substantially rod-shaped member (19) extending parallel to said rotation axis and having a substantially circular cross-section.

8. The apparatus according to claim 1, wherein said sensor has a shaft (4), and wherein said axis of rotation is substantially a tangent of said shaft.

9. The apparatus according to claim 1, wherein said sensor has a shaft, and wherein said body has a shaft-guiding inner surface (14) for guiding said shaft substantially along said sensor axis.

10. The apparatus according to claim 1, wherein said sensor has a substantially rotationally symmetric shaft.

11. The apparatus according to claim 1, wherein a rotation angle by which said fixing member can be rotated is limited by at least one mechanical stop (13,16), in particular by two mechanical stops (13,16).

12. The apparatus according to claim 1, wherein said connecting system comprises a blocking member (20) interacting with said fixing member, which is arranged at said body, and which is movable with respect to said fixing member in a substantially translational way substantially parallel to said sensor axis.

13. The apparatus according to claim 12, wherein said blocking member is movable between a first position and a second position and has an opening (21), wherein in said first position said opening is arranged next to said fixing member.

14. The apparatus according to claim 13, wherein in said second position said blocking member impedes said rotation of said fixing member.

15. The apparatus according to claim 13, wherein said movement of said blocking member is limited by at least one mechanical stop (22) to a movement between said first and said second position.

16. The apparatus according to claim 1, wherein said sensor is a sensor for water analysis.

17. Method for detachably connecting a sensor (3) for monitoring at least one property of a fluid to a body (2) containing said fluid, said sensor having a sensor axis (A), said method comprising the step of
rotating a fixing member arranged at said body in a first sense of rotation around an axis (R) of rotation, thus causing said fixing member to interact in such a way with a retaining member arranged at said sensor, that said retaining member moves in a substantially translational way substantially parallel to said sensor axis;
wherein said axis of rotation is arranged substantially perpendicular to said sensor axis.

18. An apparatus (1) comprising:
a sensor (3) having a sensor axis (A), for monitoring at least one property of a fluid;
a body (2) for comprising said fluid; and
a connecting system for detachably connecting said sensor to said body, said connecting system comprising a fixing member (9) arranged at said body, rotatable around an axis of rotation (R) and a retaining member (6) arranged at said sensor, interacting with said fixing member;
said axis of rotation being arranged substantially perpendicular to said sensor axis and said retaining member being an opening (5) in said sensor.

19. An apparatus (1) comprising:
a sensor (3) having a sensor axis (A), for monitoring at least one property of a fluid;
a body (2) for comprising said fluid; and
a connecting system for detachably connecting said sensor to said body, said connecting system comprising a fixing member (9) arranged at said body, rotatable around an axis of rotation (R) and a retaining member (6) arranged at said sensor, interacting with said fixing member;
said axis of rotation being arranged substantially perpendicular to said sensor axis; and
said connecting system further comprising a blocking member (20) interacting with said fixing member, which is arranged at said body, and which is movable with respect to said fixing member in a substantially translational way substantially parallel to said sensor axis.

20. The apparatus according to claim 19, wherein said blocking member is movable between a first position and a second position and has an opening (21), wherein in said first position said opening is arranged next to said fixing member.

21. The apparatus according to claim 20, wherein in said second position said blocking member impedes said rotation of said fixing member.

22. The apparatus according to claim 20, wherein said movement of said blocking member is limited by at least one mechanical stop (22) to a movement between said first and said second position.

* * * * *